US007261083B2

(12) United States Patent
Kondo

(10) Patent No.: US 7,261,083 B2
(45) Date of Patent: Aug. 28, 2007

(54) THROTTLE VALVE CONTROL DEVICE

(75) Inventor: Yasushi Kondo, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/518,255

(22) Filed: Sep. 11, 2006

(65) Prior Publication Data
US 2007/0056559 A1 Mar. 15, 2007

(30) Foreign Application Priority Data
Sep. 13, 2005 (JP) ............................ 2005-264809

(51) Int. Cl.
*F02D 1/00* (2006.01)
*F02D 9/08* (2006.01)
(52) U.S. Cl. ...................................... 123/399; 123/337
(58) Field of Classification Search ................ 123/337, 123/399, 400, 376
See application file for complete search history.

(56) References Cited
U.S. PATENT DOCUMENTS
4,494,639 A * 1/1985 Takano et al. ................ 477/87

5,546,903 A * 8/1996 Satou et al. ................. 123/399
6,032,647 A * 3/2000 Sato et al. ................... 123/399
6,039,027 A * 3/2000 Sato et al. ................... 123/399
2001/0045202 A1* 11/2001 Shimura et al. ............. 123/399
2002/0033166 A1* 3/2002 Shimura et al. ............. 123/399

FOREIGN PATENT DOCUMENTS
JP 2005-098178 4/2005

* cited by examiner

*Primary Examiner*—John T. Kwon
(74) *Attorney, Agent, or Firm*—Bacon & Thomas, PLLC

(57) ABSTRACT

To enhance assembling property of a throttle valve control device comprising a mechanical drive means and an electric drive means, and to enhance maintenance property at the time of checking and exchange operations of an accelerator wire, the electric drive means and the mechanical drive means are provided at an one side wall 1a of a throttle body 1 toward the one side wall 1a side from the one side direction A, the electric drive means comprises throttle valve lever 5 including a throttle valve lever open spring 8, a motor gear 9, and a drive gear 6 including an intermediate gear 10, and the mechanical drive means comprises a limb opening control lever 15, and an accelerator drum 14 including a drum close spring 16.

4 Claims, 3 Drawing Sheets

THROTTLE VALVE CONTROL DEVICE

BACKGROUND OF THE INVENTION

1. Field of the Invention

The present invention relates to a throttle valve control device for controlling air amount supplied to an internal combustion engine of a two-wheeled vehicle, an outboard motor or the like. More particularly, the present invention relates to an improved throttle valve control device comprising a throttle valve shaft crossing an intake passage, being rotatably supported by a throttle body, and being mounted with a throttle valve for opening/closing the intake passage;

a throttle valve lever being fixedly provided at the throttle valve shaft, being rotated synchronously with the throttle valve shaft, and being energized in the opening direction of the throttle valve by a throttle valve lever open spring;

an accelerator drum being provided at one end of a drum shaft, being mechanically rotated and operated in the opening/closing directions of the throttle valve by an accelerator wire, and being energized in the closing direction of the throttle valve by a drum close spring; and a limb opening control lever being provided at another end of the drum shaft, facing the throttle valve lever, and being for controlling to make an open position of the throttle valve lever by the throttle valve lever open spring to a limb opening position of the throttle valve, in a full closing operation position of the accelerator drum; and a drive gear being rotated and controlled by a motor gear rotated synchronously with a motor, being rotatably supported by the throttle valve shaft, being for controlling a throttle valve open directional position of the throttle valve lever and a throttle valve close directional position of the throttle valve lever, and being for controlling opening/closing of the throttle valve corresponding to rotation of the motor, wherein the drive gear is driven and controlled through the motor so as to make the opening position of the throttle valve correspond to the opening position of the accelerator drum.

2. Description of the Conventional Art

The above-described conventional throttle valve control device has been indicated in Japanese Patent Application Laid Open No. 2005-98178.

SUMMARY OF THE INVENTION

According to such the conventional throttle valve control device, an electric drive means is provided on the one wall side of the throttle body, and comprises a second throttle lever including a second open spring, a motor gear, a drive gear including an intermediate gear, and a throttle valve opening sensor. On the other hand, a mechanical drive means is provided on the another wall side of the throttle body, and comprises a first throttle lever including a first open spring, an accelerator drum including an accelerator wire, and an accelerator sensor for detecting an opening of the accelerator drum.

In the conventional device, the electric drive means including a plurality of parts is provided on one wall side of the throttle body, and the mechanical drive means including a plurality of parts is provided on another wall side, as described above. So, it is necessary to assemble these parts from both sides of the throttle body. Further, it is necessary to assemble those by reversing the side of the throttle body during the assembling process.

Accordingly, since a worker needs to reverse the throttle body having a comparatively large size, it is prevented to improve the assembling operation efficiency. Further, although a reversing operation can be mechanically and electrically carried out using a jig, a new assembling facility is necessary for carrying out this operation so as to increase a facility investment. Thus, it is not preferable.

Further, in a two-wheeled vehicle especially, an accelerator grip and an accelerator drum are wired and connected by an accelerator wire including a valve opening wire and a valve closing wire. The accelerator drum is mechanically rotated by the accelerator wire when a driver rotates the accelerator grip. As for the accelerator wire, the wire itself or a cylindrical wire end mounted on an end part of the wire are periodically checked and exchanged. Further, the accelerator wire is checked and exchanged after removing a cover 16 (the same code as indicated in the above-described gazette is used) mounted with the accelerator drum from the throttle body.

On the other hand, a predetermined space $\theta$ for obtaining a limb opening is formed between the accelerator drum and a first throttle lever 10 (the same code as indicated in the above-described gazette is used) mounted on a right end of the throttle valve shaft. At this time, the cover 16 mounted with the accelerator drum is repeatedly detached as described above. Thus, in order to keep the predetermined space $\theta$ formed between the accelerator drum and the first throttle lever 10 for obtaining the limb opening, it is necessary to carefully assemble these parts, so that much time and skill are required for the assembling operation.

Further, when the cover 16 is removed, the first throttle lever 10 is directly exposed to the atmosphere. Thereby, foreign matters such as dust or the like may adhere on the first throttle lever 10 under a condition that a work environment is not fixed. Thus, a careful operation is required in order to obtain the predetermined space $\theta$, so that maintenance property is prevented.

The present invention solves the above-described problems, and an objective of the present invention is to provide a throttle valve control device having excellent assembling property and low cost, in which opening/closing of a throttle valve is controlled by a mechanical drive means of an accelerator drum and a electric drive means of a motor. Further, an objective of the present invention is to provide a throttle valve control device having excellent maintenance property, in which an accelerator wire can be very easily checked and exchanged in a short time, and a predetermined space (for obtaining a limb opening) can be constantly formed and kept between a limb opening control lever and a throttle valve lever during a maintenance operation of the accelerator wire.

In order to obtain the above-described objective, a throttle valve control device according to the present invention has the following first aspect: The device comprises a throttle valve shaft crossing an intake passage, being rotatably supported by a throttle body, and being mounted with a throttle valve for opening/closing the intake passage;

a throttle valve lever being fixedly provided at the throttle valve shaft, being rotated synchronously with the throttle valve shaft, and being energized in the opening direction of the throttle valve by a throttle valve lever open spring;

an accelerator drum being provided at one end of a drum shaft, being mechanically rotated and operated in the opening/closing directions of the throttle valve by an accelerator wire, and being energized in the closing direction of the throttle valve by a drum close spring;

a limb opening control lever being provided at another end of the drum shaft, facing the throttle valve lever, and being for controlling to make an open position of the throttle valve lever by the throttle valve lever open spring to a limb opening position of the throttle valve, in a full closing operation position of the accelerator drum; and a drive gear being rotated and controlled by a motor gear rotated synchronously with a motor, being rotatably supported by the throttle valve shaft, being for controlling a throttle valve open directional position of the throttle valve lever and a throttle valve close directional position of the throttle valve lever, and being for controlling opening/closing of the throttle valve corresponding to rotation of the motor, in which the drive gear is driven and controlled through the motor so as to make the opening position of the throttle valve correspond to the opening position of the accelerator drum; wherein the throttle valve lever including the throttle valve lever open spring, the drive gear including the motor gear, and the accelerator drum including the limb opening control lever and the drum close spring are provided at one side wall of the throttle body.

Further, the present invention has the following second aspect in the throttle valve control device in addition to the first aspect: A throttle body recessed part extending toward a first flange part in the one side direction is formed at the one side wall of the throttle body.

A first cover has a first recessed part being recessed by a partition wall, facing the throttle body recessed part and extending toward a second flange part in the another side direction; and a second recessed part being recessed from the partition wall toward a third flange part in the one side direction. Further, a second cover has a third recessed part facing the second recessed part and recessed from bottom part toward a fourth flange part in another side direction.

The second flange part of the first cover is provided contacting to the first flange part of the throttle body, so as to form a first housing chamber by the throttle body recessed part and the first recessed part, the fourth flange part of the second cover is provided contacting to the third flange part of the first cover so as to form a second housing chamber by the second recessed part and the third recessed part;

a one end part of the throttle valve shaft rotatably supported by the throttle body is projected and provided in the first housing chamber, the throttle valve lever, which includes the throttle valve lever open spring, and the drive gear are provided at this projecting part, an intermediate gear geared with the drive gear and the motor gear are provided at the projecting part;

on the other hand, the drum shaft is rotatably supported by a bearing boss provided at a bottom part of the first cover, the limb opening control lever provided at another end of the drum shaft is provided facing the throttle valve lever in the first housing chamber, further, the accelerator drum, which is provided at the one end of the drum shaft and includes the drum close spring, is provided in the second housing chamber.

Further, the present invention has the following third aspect in the throttle valve control device in addition to the second aspect: A sensor housing hole is provided at another side wall of the throttle body, faces another end part of the throttle valve shaft, and is opened toward the another side direction. A throttle valve opening sensor is housed and provided in the sensor housing hole, and the another end part of the throttle valve shaft is fitted and connected to the throttle valve opening sensor.

Furthermore, the present invention has the following fourth aspect in the throttle valve control device in addition to the second aspect: A limb adjusting screw and an idling adjusting screw are screwed and provided at the side wall part which forms the first recessed part of the first cover. The limb adjusting screw faces a closing directional end face of the limb opening control lever and is for adjusting the limb opening by the limb opening control lever. The idling adjusting screw faces a closing directional end face of the drive gear and is for adjusting the idling opening by the drive gear.

According to the first aspect of the present invention, the electric drive means is provided from the one side of the throttle body toward the one side wall of the throttle body. The electric drive means includes the throttle valve open spring, the throttle valve lever, the drive gear, the intermediate gear, and the motor gear. Further, the mechanical drive means is provided like the electric drive means. The mechanical drive means includes the limb opening control lever, the drum close spring and the accelerator drum. Thereby, all drive means can be intensively assembled in same direction, that is, from the one side of the throttle body toward the one side wall of the throttle body. Thus, it is not necessary to reverse the throttle body having a large size during the assembling operation of these parts, so that assembling operation efficiency can be remarkably improved, and production cost can be decreased.

Further, the mechanical drive means and the electric drive means are intensively provided at the one side of the throttle body as described above. Thus, when the drive means portion is provided on the side of a cam chain or a cam gear of an internal combustion engine, a dead space formed by the cam chain or the cam gear can be effectively used. So, it is preferable for a two-wheeled vehicle especially having a limited housing space of apparatuses.

Furthermore, when the drive means portion is intensively provided at the one side of the throttle body, the another side of the throttle body can be shapely simplified. Thus, when the device is mounted on a two-wheeled vehicle especially, an appearance of the vehicle can be simplified.

According to the second aspect of the present invention, the one end part of the throttle valve shaft is provided projecting from the one sidewall of the throttle body toward the one side direction through the throttle body recessed part. The throttle valve lever, which includes the throttle valve lever open spring, and the drive gear can be provided at the one end part of the throttle valve shaft.

Further, the intermediate gear including the motor gear is provided facing the one side wall of the throttle body, and the motor gear is provided gearing with and connecting to the drive gear through the intermediate gear.

On the other hand, the drum shaft is rotatably provided at the bearing boss of the first cover. The limb opening control lever is mounted on the another end of the drum shaft projected in the first recessed part of the first cover, and the accelerator drum is mounted on the one end of the drum shaft projected in the second recessed part of the first cover.

In this case, the second flange part of the first cover is provided contacting to an upper part of the first flange part of the throttle body, so as to form the first housing chamber by the throttle body recessed part and the first recessed part. The throttle valve lever including the throttle valve lever open spring, the intermediate gear including the drive gear, the motor gear and the limb opening control lever can be housed and provided in the first housing chamber.

Further, the fourth flange part of the second cover including the drum opening sensor is provided contacting to the third flange part of the first cover, so as to form the second housing chamber by the second recessed part and the third recessed part. The accelerator drum including the drum close spring and the accelerator wire can be housed and provided in the second housing chamber.

Accordingly, the throttle valve lever including the throttle valve lever open spring, the motor gear, and the drive gear including the intermediate gear are assembled from the one side of the throttle body toward the one side wall side of the throttle body. Further, the second flange part of the first cover having the limb opening control lever and the accelerator drum including the drum close spring are assembled from the one side of the throttle body toward the first flange part of the one side wall side of the throttle body.

Further, the fourth flange part of the second cover including the drum opening sensor is provided from the one side of the throttle body toward the third flange part of the first cover.

Thereby, the electric drive means can be assembled from the one side of the throttle body toward the one side wall side of the throttle body, where the electric drive means includes the throttle valve lever open spring, the throttle valve lever, the motor gear, the intermediate gear, and the drive gear. Further, the mechanical drive means can be assembled from the one side of the throttle body toward the one side wall side of the throttle body, where the mechanical drive means includes the limb opening control lever, the drum close spring, the accelerator drum, and the accelerator wire. Thus, all parts constituting the device can be assembled from the one side of the throttle body toward the one side wall side of the throttle body. Therefore, it is not necessary to reverse the throttle body during the assembling operation, and the operation efficiency can be remarkably increased. Further, it is not necessary to prepare the jig for reversing the throttle body, so that the production cost can be remarkably decreased.

Further, when the accelerator wire is checked and exchanged, the second cover is removed from the first cover, and thereby, the accelerator drum and the accelerator wire can be exposed on the atmosphere side in the one side direction.

Accordingly, an engaging state of the accelerator wire, the cylindrical wire end provided at the end part of the accelerator wire, and the engaging hole of the accelerator drum can be easily checked, and an exchange operation of the accelerator wire can be easily carried out.

On the other hand, when the second cover is removed from the first cover and the second cover is re-mounted on the first cover, a positioning relationship between the limb opening control lever and the throttle valve lever is not varied at all. Thus, a space for obtaining an initially set limb opening can be stably kept between the limb opening control lever and the throttle valve lever.

Further, when the second cover is removed from the first cover, the limb opening control lever, the throttle valve lever, the drive gear, the intermediate gear and the motor gear are housed and provided in the sealed first housing chamber. Thus, foreign matters from the external do not adhere to the space for making the limb opening, and the foreign matters do not adhere to the gearing part of the gear part, so that maintenance property can be remarkably improved.

Further, according to the third aspect of the present invention, the throttle valve opening sensor is provided at the sensor housing hole provided at the another side wall of the throttle body, and is fitted and connected to the another end part of the throttle valve shaft. Thus, the throttle valve shaft and the throttle valve opening sensor are supported by the common throttle body not through another member, so that a rotation angle of the throttle valve shaft can be certainly and stably detected for a long period of time.

Furthermore, according to the fourth aspect of the present invention, the limb adjusting screw and the idling adjusting screw are screwed and provided at the side wall part of the first cover. Thus, the adjusting members is not distributed to other members, so that the adjusting operation can be easily carried out, and a screw processing can be easily carried out.

DETAILED DESCRIPTION OF PREFERRED EMBODIMENT

Hereinafter, one example of a throttle valve control device according to the present invention is described with FIG. 1.

Figure 1:
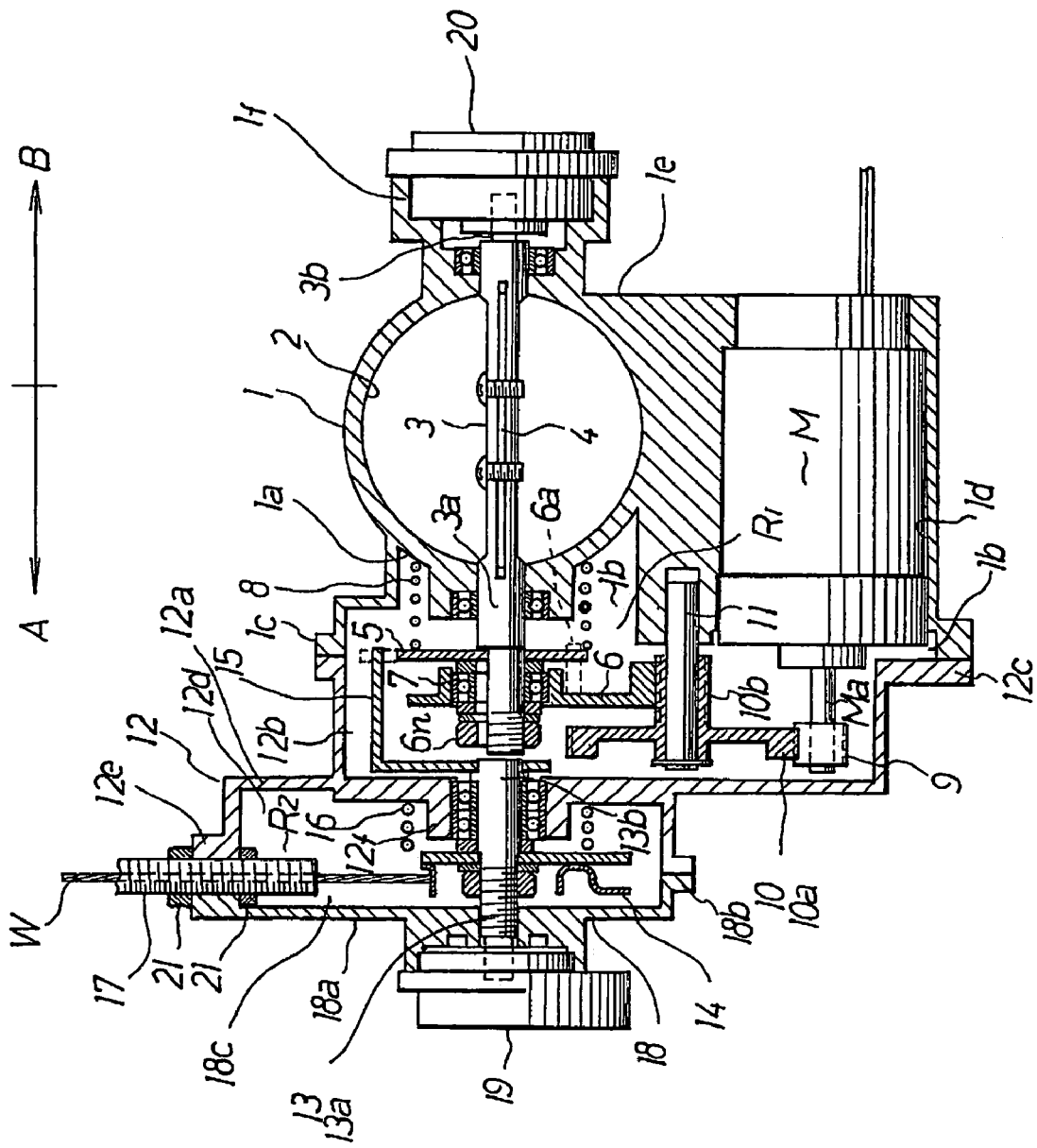
FIG. 1 is a longitudinal sectional view of main parts illustrating a throttle valve control device according to the present invention.

FIG. 1 is a longitudinal sectional view of main parts.

A throttle body 1 has an intake passage 2 provided through therein. The upstream side of the intake passage 2 is connected to an air cleaner, and the down stream side is connected to an internal combustion engine.

A throttle valve shaft 3 crosses the intake passage 2, and both ends of the throttle valve shaft 3 are rotatably supported by the throttle body 1 through bearings. The throttle valve shaft 3 is screwed with a butterfly type throttle valve 4 for opening/closing the intake passage 2 by screws. That is, when the throttle valve shaft 3 is rotated, the throttle valve 4 synchronously controls opening/closing of the intake passage 2.

A throttle body recessed part 1*b* is recessed from one side wall 1*a* (a left side wall in the drawings) of the throttle body 1 toward the one side direction A (the left direction in the drawings). A first flange part 1*c* is annularly formed at an opening end on the one side of the throttle body recessed part 1*b*.

In addition, a motor housing hole 1*d* is provided at a lower part of the throttle body 1, and at least one end of the motor housing hole 1*d* is opened in the throttle body recessed part 1*b*. Further, a sensor housing hole 1*f* is provided at an another side wall 1*e* (a right side wall in the drawings) of the throttle body 1, and faces an another end part 3*b* of the throttle valve shaft 3.

An one end part 3*a* of the throttle valve shaft is provided being projected toward the one side direction A through the throttle body recessed part 1*b*, and assembled with the following parts from the one side wall 1*a* side of the throttle body 1 toward the one side direction A (the left direction in the drawings).

A throttle valve lever 5 is fixedly provided toward a locking stepped part 3c by a nut 6n.

A drive gear 6 is formed with a spur gear, and rotatably supported by the throttle valve shaft 3 through a bearing 7. The throttle valve lever is given energizing force in the opening direction of the throttle valve 4 by a throttle valve open spring 8. The throttle valve open spring 8 made of a coil spring is inserted and provided from the one side direction A toward the one side wall 1a side of the throttle body 1, and one end of the throttle valve open spring 8 is locked with the throttle valve lever 5, and another end is locked with the throttle body 1.

Further, a motor M is inserted and provided in the motor housing hole 1d. A motor gear 9 is fixedly provided at an output shaft Ma projected toward the one side direction A from the motor M. The motor gear 9 and the drive gear 6 are geared and connected with an intermediate gear 10.

More particularly, the intermediate gear 10 is rotatably supported by a shaft 11 erected at the throttle body 1, and is formed in two stages with a large diameter gear 10a and a small diameter gear 10b which are formed in the shaft center direction. The large diameter gear 10a is geared with the motor gear 9, and the small diameter gear 10b is geared with the drive gear 6.

The throttle valve lever open spring 8, the throttle valve lever 5, the drive gear 6, the motor M, the motor gear 9 and the intermediate gear 10 are mounted from the one side direction A toward the one side wall 1a (that is, toward the another side direction B) of the throttle body 1, and are mounted facing the throttle body recessed part 1b.

A first cover 12 has a first recessed part 12b recessed from a partition wall 12a toward the another side direction B. A second flange part 12c contacted with a first flange part 1c is formed at an opening end toward the another side direction B of the first recessed part 12b.

Further, a second recessed part 12d is recessed from the partition wall 12a toward the one side direction A, and a third flange part 12e is formed at an opening end toward the one side direction A of the second recessed part 12d.

Further, a bearing boss 12f is erected at the partition wall 12a of the first cover 12, and a drum shaft 13 is rotatably supported penetrating the bearing boss 12f. An one end 13a of the drum shaft 13 is provided projecting in the second recessed part 12d. An another end 13b of the drum shaft 13 is provided projecting in the first recessed part 12b.

Further, a accelerator drum 14 is fixed at the one end 13a of the drum shaft 13 projected in the second recessed part by a nut, and a limb opening control lever 15 is fixed at the another end 13b of the drum shaft 13 projected in the first recessed part 12b.

In addition, a drum close spring 16 made of a coil spring is provided on an outer periphery of the bearing boss and in the second recessed part 12d. One end of the drum close spring 16 is locked with the accelerator drum 14, and another end is locked with the first cover 12. Thereby, the drum shaft 13 is given energizing force in the closing direction of the throttle valve 4. Spring force of the drum close spring 16 is set stronger than that of the throttle valve lever open spring 8.

Further, a cable holder 17 has an accelerator wire W inserted and provided therein, and is fixedly provided between the first cover 12 and a second cover described below. As for the cable holder 17, two holders, that is, a valve opening cable holder and a valve closing cable holder are prepared. A valve opening accelerator wire is inserted and provided in the valve opening cable holder, and a valve closing accelerator wire is inserted and provided in the valve closing cable holder. In addition, one end of the accelerator wire is locked with the accelerator drum 14 through a cylindrical cable end, and another end is locked with an accelerator grip operated by an operator. Accordingly, when an operator operates the accelerator grip, the accelerator drum 14 is rotated clockwisely or counterclockwisely by the accelerator wire W. The drum shaft 13 and the limb opening control lever 15 are rotated synchronously with rotation of the accelerator drum. In addition, a single cable holder 17 and a single accelerator wire W are illustrated in FIG. 1.

A second cover 18 has a third recessed part 18c recessed from a bottom part 18a toward a fourth flange part 18b of the another side direction B. A drum opening sensor 19 fitted and connected to the one end 13a of the drum shaft 13 is mounted on the bottom part 18a.

Further, a throttle valve opening sensor 20 is fixedly provided in the sensor housing hole 1f of the throttle body 1, and is fitted and connected to the another end part 3b of the throttle valve shaft 3.

Then, assembling of the throttle valve control device according to the present invention is described.

The throttle valve shaft 3 is rotatably provided at the throttle body 1, and the throttle valve shaft 3 in the intake passage 2 is screwed with the throttle valve 4 by screws. At this time, the one end part 3a of the throttle valve shaft 3 is provided being projected from the one side wall 1a of the throttle body 1 toward the one side direction A, and the another end part 3b of the throttle valve shaft 3 is provided being projected toward the sensor housing hole 1f.

Further, the throttle valve opening sensor 20 is inserted and fixedly provided in the sensor housing hole 1f provided at the another side wall 1e of the throttle body 1. At this time, the throttle valve opening sensor 20 is fitted and provided at the another end part 3b of the throttle valve shaft 3.

In the above-description, the throttle valve opening sensor 20 is assembled toward the another side wall 1e of the throttle body 1. However, since only a single part is assembled, assembling property is not prevented.

Then, the throttle valve lever 5 and the drive gear 6 are provided at the one end part 3a of the throttle valve shaft 3 projected from the one side wall 1a of the throttle body 1 toward the one side direction A. More particularly, the throttle valve lever 5 provided on the locking stepped part 3c of the throttle valve shaft 3 is tightened by a nut 6n through an inner race of the bearing 7, so that the throttle valve lever 5 is fixed at the throttle valve shaft 3, and the drive gear 6 is rotatably provided at the throttle valve shaft 3 through the bearing 7.

In addition, at the time of the above-described assembling, the throttle valve lever open spring 8 is provided between the throttle valve lever 5 and the one side wall 1a of the throttle body 1. The one end of the spring 8 is locked with the throttle valve lever 5, and the other end is locked with the one side wall 1a of the throttle body 1.

Further, the motor M is inserted and provided in the motor housing hole 1d of the throttle body 1, and the motor gear 9 is fixed at the output shaft Ma of the motor M projected from the one side wall 1a of the throttle body 1 toward the one side direction A. Further, the intermediate gear 10 is rotatably provided at the shaft 11 provided being projected from the onside wall 1a of the throttle body 1 toward the one side direction A. The intermediate gear 10 is formed in two stages with the large diameter gear 10a and the small diameter gear 10b. At this time, the motor gear 9 and the large diameter gear 10a are geared, and the small diameter gear 10b and the drive gear 6 are geared.

Accordingly, the throttle valve lever open spring 8, the throttle valve lever 5, the drive gear 6, the motor M, the motor gear 9 and the intermediate gear 10 can be assembled from the one side direction A of the throttle body 1 toward the one side wall 1a of the throttle body 1 (that is, from the one side direction A toward the another side direction B).

On the other hand, the first cover 12 is assembled with the following parts.

The drum shaft 13 is rotatably provided at the bearing boss 12f of the first cover 12. The limb opening control lever 15 is fixed at the another end 13b of the drum shaft 13 projected in the first recessed part 12b. The accelerator drum 14 is screwed to the one end 13a of the drum shaft 13 projected in the second recessed part 12d by a nut.

In addition, one end of the drum close spring 16, which is provided in the second recessed part 12d and on the outer periphery of the bearing boss 12f, is locked with the accelerator drum 14, and another end is locked with the first cover 12.

In addition, spring force of the drum close spring 16 is set stronger than spring force of the throttle valve lever open spring 8.

Further, the second flange part 12c of the first cover 12 having the above-described constitution is contacted with the first flange part 1c of the throttle body 1, and screwed and fixed to it. Thereby, a first housing chamber R1 is formed with the throttle body recessed part 1b of the throttle body 1 and the first recessed part 12b of the first cover 12. The throttle valve lever 5 including the throttle valve lever open spring 8, the drive gear 6, the intermediate gear 10, the motor gear 9 and the limb opening control lever 15 are provided in the first housing chamber R1, and the motor M is provided facing the first housing chamber R1.

Further, the valve opening and valve closing cable holders 17 facing the second recessed part 12d are held by and fixed to the first cover 12 with two nuts 21. A wire end provided at the end part of the valve opening wire W and a wire end provided at the end part of the valve closing wire W (the wire ends are not illustrated in the drawings) are locked and provided in the locking hole of the accelerator drum 14, where the wire end of the valve opening wire W is inserted and provided in the valve opening cable holder 17, and the wire end of the valve closing wire W is inserted and provided in the valve closing holder 17.

Further, the fourth flange part 18b of the second cover 18 including the drum opening sensor 19 is contacted with the third flange part 12e of the first cover 12 and is screwed to it. Thereby, a second housing chamber R2 is formed by the second recessed part 12d of the first cover 12 and the third recessed part 18c of the second cover 18. The accelerator drum 14 including the drum close spring 16 is provided in the second housing chamber R2, and the valve opening and valve closing cable holders 17 are provided facing each other in the second housing chamber R2. The wire ends of the valve opening and valve closing accelerator wires W are locked with the accelerator drum 14.

Further, the one end 13a of the drum shaft 13 is fitted and connected to the drum opening sensor 19 provided on the second cover 18.

Accordingly, assembling of the throttle valve control device is completed, and the throttle valve control device controls opening/closing of the intake passage 2 by the following processes.

Figure 2:
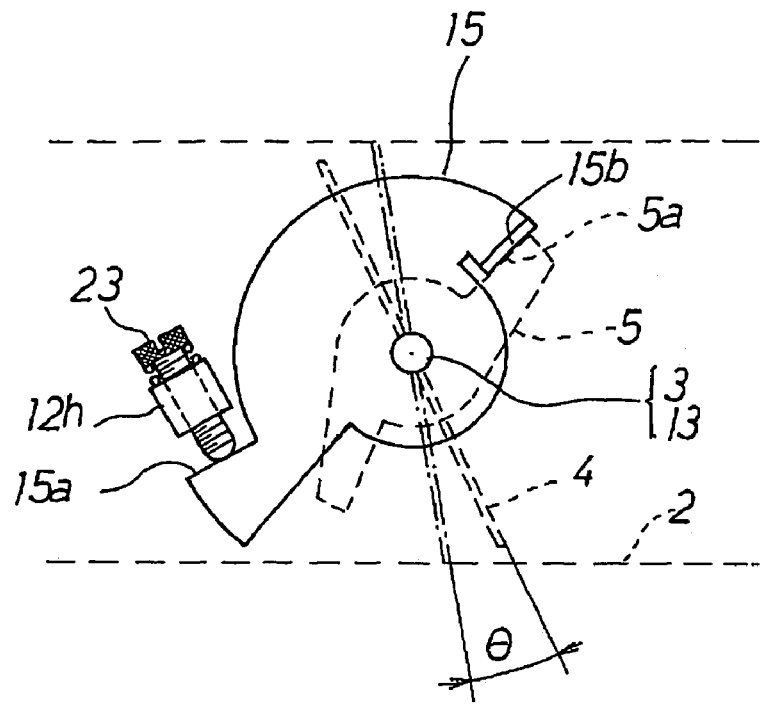
FIG. 2 is a schematic view illustrating a positioning relationship between a limb opening control lever and a throttle valve lever 5 in the state that an internal combustion engine is stopped.
Figure 3:
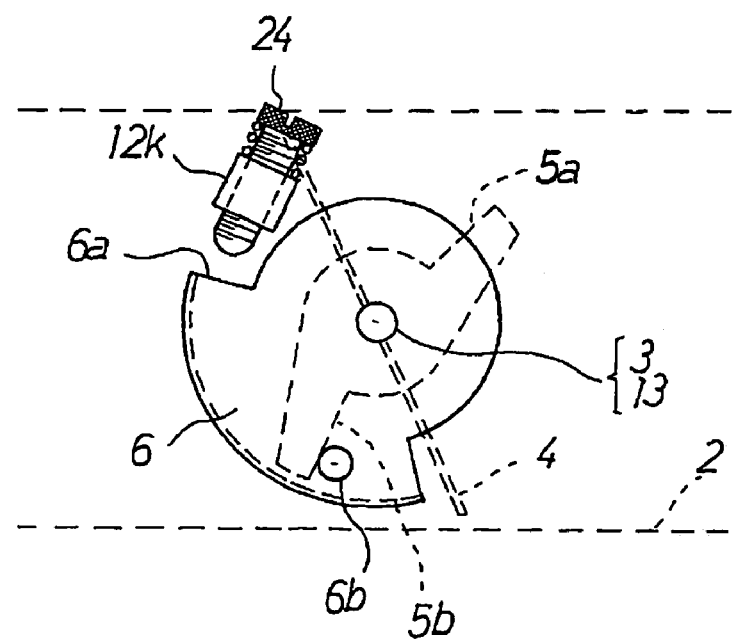
FIG. 3 is a schematic view illustrating a positioning relationship between a drive means and a throttle valve lever 5 in the state that an internal combustion engine is stopped.

The stopping state of an internal combustion engine is described using FIGS. 2 and 3. The accelerator drum 14 is energized in the closing direction of the throttle valve 4 (in the clockwise direction in FIG. 2) by spring force of the drum close spring 16. The rotation position in the closing direction of the throttle valve 4 of the accelerator drum 14 is stopped at the closing position, at which a closing directional end face 15a of the limb opening control lever 15, which is synchronously rotated with the accelerator drum 14, is contacted with the top end of a limb adjusting screw 23, which is screwed to a first supporting boss 12h integrally formed with the first cover 12.

On the other hand, the throttle valve lever 5 is energized in the opening direction of the throttle valve 4 by spring force of the throttle valve lever open spring 8, that is, energized counterclockwisely in FIG. 3. The rotation of the throttle valve lever 5 in the throttle valve opening direction is stopped in the state that a first opening directional end face 5a of the throttle valve lever 5 is contacted with a limb opening control end face 15b of the limb opening control lever 15.

Further, in the state that the first opening directional end face 5a of the throttle valve lever 5 is contacted with the limb opening control end face 15b of the limb opening control lever 15, a limb opening θ of the throttle valve 4 (an opening being opened by θ angle from the fully closing state of the throttle valve 4) can be kept, in which this opening is more opened than a first idling opening of the throttle valve 4. Thereby, biting of the throttle valve 4 to the intake passage 2 at the time of stopping the internal combustion engine can be prevented, and the throttle valve 4 can be certainly opened to have the limb opening when the motor M cannot be operated.

On the other hand, in such state, a drive pin 6a erected at the drive gear 6 is provided contacting to a second directional end face 5b of the throttle valve lever 5, as illustrated in FIG. 3. A space is formed between a closing directional end face 6a of the drive gear 6 and a top end of an idling adjusting screw 24, which is screwed to a second supporting boss 12k integrally formed with the first cover 12.

In addition, when the limb adjusting screw 23 is screwed so as to rotate the limb opening control lever 15, the throttle valve lever 5 can be rotated. Thereby, the limb opening θ of the throttle valve 4 can be properly and freely adjusted.

Figure 4:
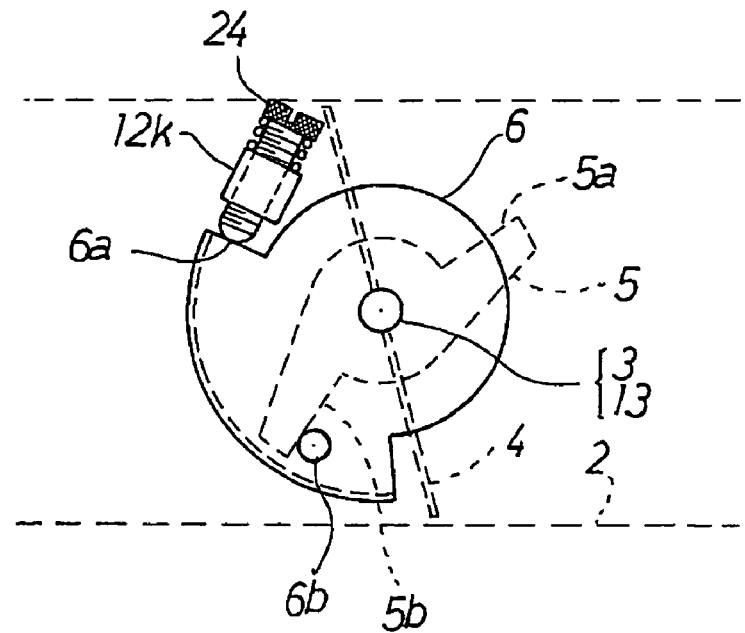
FIG. 4 is a schematic view illustrating a positioning relationship between a limb opening control lever and a throttle valve lever in the state that an internal combustion engine is in idling-operation.
Figure 5:
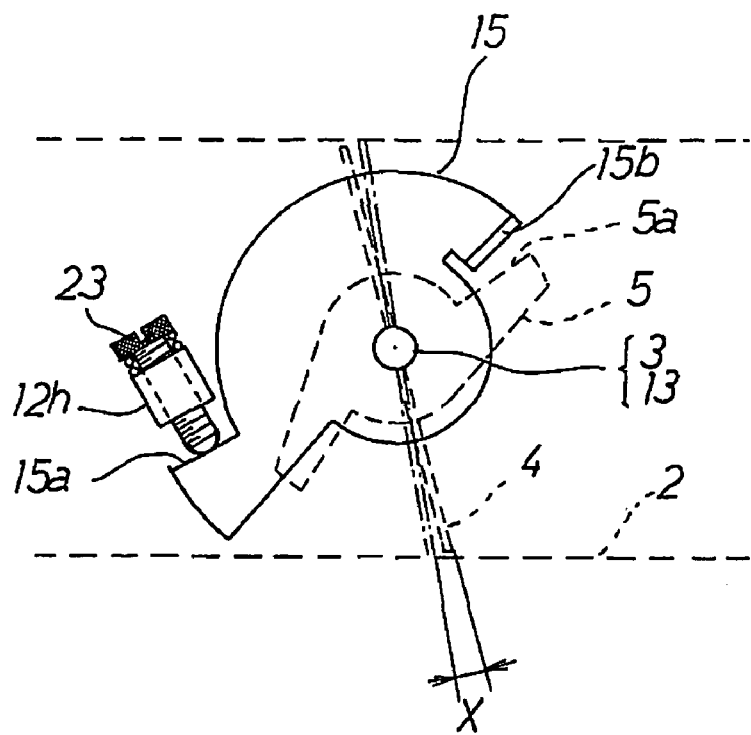
FIG. 5 is a schematic view illustrating a positioning relationship between a drive means and a throttle valve lever in the state that an internal combustion engine is in idling-operation.

Then, the idling operation of the internal combustion engine is carried out as illustrated in FIGS. 4 and 5.

When the internal combustion engine starts and the drum opening sensor 19 determines the fully closing position of the accelerator drum 14, the motor M receives an output sign from an electric control unit not illustrated in the drawings, and the drive gear 6 is clockwisely rotated in FIG. 6. Then, the drive pin 6b presses the second opening directional end face 5b of the throttle valve lever 5 so as to clockwisely rotate the throttle valve lever 5 while resisting against spring force of the throttle valve lever open spring 8, so that the throttle valve 4 is closed toward an desired idling opening X from the limb opening θ.

Further, when the desired idling opening X is confirmed by an output signal of the throttle valve opening sensor 20, operation of the motor M is stopped, and thereby, the desired idling opening of the throttle valve 4 can be kept.

In addition, when the idling adjusting screw 24 is screwed, a rotation position in the clockwise direction of the drive gear 6 can be controlled, and the idling opening X can be properly and freely adjusted.

Further, in the above-described idling operation, an operator does not operate opening the accelerator drum 14, and the closing directional end face 15a of the limb opening control lever 15 is provided contacting with the limb adjusting screw 23 yet. Thus, the first opening end face 5a of the throttle valve lever 5 is positioned separating from the limb opening control end face 15b of the limb opening control lever 15.

Further, in an accelerative operation of the internal combustion engine, the accelerator drum 14 is counterclockwisely rotated in FIG. 3 by the accelerator wire W. The electric control unit operates the motor M on the basis of an output signal of the drum opening sensor 19 for detecting the rotation angle of the accelerator drum 14, so as to counterclockwisely rotate the drive gear 6 in FIG. 3, so that the drive pin 6b is also synchronously moved in the opening direction (in the counterclockwise direction).

Accordingly, the second opening directional end face 5b of the throttle valve lever 5 is counterclockwisely rotated following the moving of drive pin 6a by spring force of the throttle valve lever open spring 8, so that the throttle valve 4 opens the intake passage 2.

Further, when the electric unit confirms that the output signal of the throttle valve opening sensor 20 for detecting the opening of the throttle valve 4 is matched with the output signal of the drum opening sensor 19 for detecting the opening of the accelerator drum 14, the electric control unit stops the operation of the motor M, and thereby, the throttle valve 4 can have the opening corresponding to the opening position of the accelerator drum 14.

On the other hand, in a speed reducing operation of the internal combustion engine, the accelerator drum 14 is clockwisely rotated in FIG. 3 by the accelerator wire W, and electric control unit operates the motor M on the basis of the output signal of the drum opening sensor 19 for detecting the rotation angle of the accelerator drum 14. Thus, the drive gear 6 is clockwisely rotated in FIG. 4, and the drive pin 6b is also synchronously moved in the closing direction (the clockwise direction).

Accordingly, the drive pin 6b clockwisely rotates the second opening directional end face 5b of the throttle valve lever 5 so as to clockwisely rotate the throttle valve lever 5 corresponding to the moving of the drive pin 6b, so that the throttle valve 4 closes the intake passage 2.

Further, rotation of the motor M is stopped at a position at which the output signals of the drum opening sensor 19 and the throttle valve opening sensor 20 are matched, and the throttle valve 4 can keep the opening corresponding to the closing directional position of the accelerator drum 14.

According to the throttle valve control device of the present invention, throttle valve lever 5 including the throttle lever open spring 8, the motor M including the drive gear 6 and the motor gear 9, and the intermediate gear 10 are provided on the one side wall 1a of the throttle body 1. Further, the limb opening control lever 15, the accelerator drum 14 including the drum close spring 16, and the accelerator wire W engaged with the accelerator drum 14 are also provided on the one side wall 1a of the throttle body 1. Thus, all of the above-described parts are provided toward the one side wall 1a of the throttle body 1, that is, toward the another side direction B from the one side direction A. Therefore, when assembling these parts to the throttle body 1, it is not necessary to reverse the throttle body, so that the operation efficiency can be improved, and the production cost can be decreased.

Further, the electric drive means comprising the motor M including the drive gear 6, the intermediate gear 10 and the motor gear 9, and the mechanical drive mans including the limb opening control lever 15 and the accelerator drum 14 are intensively provided on the one side wall 1a of the throttle body 1. Thus, since the drive means is provided on the side of a cum chain or a cum gear in the internal combustion engine, the dead space formed with the cum chain or the like can be effectively used. Further, the another side wall 1e of the throttle body 1 can be shapely simplified. Thus, it is preferable to mount the device on the two-wheeled vehicle especially.

Further, the first housing chamber R1 is formed by the throttle body recessed part 1b of the throttle body 1 and the first recessed part 12b of the first cover 12. The throttle valve lever 5 including the throttle valve lever open spring 8, the drive gear 6, the intermediate gear 10, the motor gear 9 and the limb opening control lever 15 are housed and provided in the first housing chamber R1. The second housing chamber R2 is formed by the second recessed part 12d of the first cover 12 and the second cover 18. The accelerator drum 14 including the drum close spring 16, and the accelerator wire W are housed and provided in the second housing chamber R2. So, in addition to the above-described preferable operation and effect, when the accelerator wire W is checked and exchanged, the accelerator drum 14 and the accelerator wire W can be exposed to the atmosphere side by only removing the second cover 18, so that the operation can be easily carried out.

On the other hand, when the second cover 18 is removed and re-assembled, the positioning relationship between the limb opening control lever 15 and the throttle valve lever 5 is not varied at all. So, the exact limb opening θ formed with the limb opening control lever 15 and the throttle valve lever 5 can be stably kept for a long period of time. Further, in the above-description, the limb opening control lever 15, the throttle valve lever 5, the drive gear 6, the intermediate gear 10, and the motor gear 9 are housed and provided in the first housing chamber R1 which is closed and covered. So, even when the accelerator wire W is checked and exchanged under an insufficient environment, a problem caused by foreign matters, biting of foreign matters between the limb opening control lever 15 and the throttle valve lever 5, and biting of foreign matters between the gear parts 6, 10 and 9 can be prevent.

Further, the drum shaft 13 is rotatably supported by the bearing boss 12f of the first cover 12, in which the first recessed part 12b and the second recessed part 12d are recessed. The limb opening control lever 15 is fixedly provided at the another end 13b projected in the first recessed part 12b of the drum shaft 13. The accelerator drum 14 including the drum close spring 16 is fixedly provided at the one end 13a of the drum shaft 13 projected in the second recessed part 12d. Thus, the limb opening control lever 15 and the accelerator drum 14 including the drum close spring 16 can be sub-assembled toward the first cover 12 in advance separately from the throttle body 1. Then, the first cover 12 can be assembled toward the one side wall 1a of the throttle body 1, so that the assembling operation efficiency can be more improved.

Further, the throttle valve opening sensor 20 is housed and fixed at the sensor housing hole 1f provided at the throttle body 1, and is fitted and connected to the another end 3b of the throttle valve shaft 3. So, both of the throttle valve opening sensor 20 and the throttle valve shaft 3 are supported by the common throttle body 1. Thus, the exact and stable rotation angle of the throttle valve shaft 3 can be detected for a long time of period.

Further, both of the limb adjusting screw 23 for controlling the fully closing directional position of the limb opening control lever 15 and the idling adjusting screw 24 for controlling the fully closing directional position of the drive gear 6 are provided at the side wall of the first cover 12. So, the adjusting members can be intensively provided at the first cover 12, so that the screw processing and the adjusting operation can be easily carried out.

What is claimed is:

1. A throttle valve control device comprising:
   a throttle valve shaft crossing an intake passage, being rotatably supported by a throttle body, and being mounted with a throttle valve for opening/closing the intake passage;
   a throttle valve lever being fixedly provided at the throttle valve shaft, being rotated synchronously with the throttle valve shaft, and being energized in the opening direction of the throttle valve by a throttle valve lever open spring;
   an accelerator drum being provided at an one end of a drum shaft, being mechanically rotated and operated in the opening/closing directions of the throttle valve by an accelerator wire, and being energized in the closing direction of the throttle valve by a drum close spring;
   a limb opening control lever being provided at an another end of the drum shaft, facing the throttle valve lever, and being for controlling to make an opening position of the throttle valve lever by the throttle valve lever open spring to a limb opening position of the throttle valve, in a full closing operation position of the accelerator drum; and
   a drive gear being rotated and controlled by a motor gear rotated synchronously with a motor, being rotatably supported by the throttle valve shaft, being for controlling a throttle valve open directional position of the throttle valve lever and a throttle valve close directional position of the throttle valve lever, and being for controlling opening/closing of the throttle valve corresponding to rotation of the motor, in which the drive gear is driven and controlled through the motor so as to make the opening position of the throttle valve correspond to the opening position of the accelerator drum;
   wherein the throttle valve lever including the throttle valve lever open spring, the drive gear including the motor gear, and the accelerator drum including the limb opening control lever and the drum close spring are provided at a one side wall of the throttle body.

2. The throttle valve control device as claimed in claim 1,
   wherein a throttle body recessed part extending toward a first flange part in a one side direction is formed at the one side wall of the throttle body;
   a first cover has a first recessed part being recessed by a partition wall, facing the throttle body recessed part and extending toward a second flange part in an another side direction, and a second recessed part being recessed from the partition wall toward a third flange part in the one side direction;
   a second cover has a third recessed part facing the second recessed part and being recessed toward a fourth flange part in the another side direction;
   the second flange part of the first cover is provided contacting to the first flange part of the throttle body so as to form a first housing chamber by the throttle body recessed part and the first recessed part;
   the fourth flange part of the second cover is provided contacting to the third flange part of the first cover so as to form a second housing chamber by the second recessed part and the third recessed part;
   a one end part of the throttle valve shaft rotatably supported by the throttle body is projected and provided in the first housing chamber, and the throttle valve lever including the throttle valve lever open spring and the drive gear are provided at the projecting part;
   an intermediate gear geared with the drive gear and the motor gear are provided at the projecting part;
   the drum shaft is rotatably supported by a bearing boss provided at the partition wall of the first cover, and the limb opening control lever provided at the another end of the drum shaft is provided facing the throttle valve lever in the first housing chamber; and
   the accelerator drum, which is provided at the one end of the drum shaft and includes the drum close spring, is provided in the second housing chamber.

3. The throttle valve control device as claimed in claim 2,
   wherein a sensor housing hole is provided at an another side wall of the throttle body, faces an another end part of the throttle valve shaft, and is opened toward the another side direction; and
   a throttle valve opening sensor is housed and provided in the sensor housing hole, and the another end part of the throttle valve shaft is fitted and connected to the throttle valve opening sensor.

4. The throttle valve control device as claimed in claim 2,
   wherein a limb adjusting screw and an idling adjusting screw are screwed and provided at the side wall part which forms the first recessed part of the first cover;
   the limb adjusting screw faces a closing directional end face of the limb opening control lever and is for adjusting a limb opening by the limb opening control lever; and
   the idling adjusting screw faces a closing directional end face of the drive gear and is for adjusting an idling opening by the drive gear.

* * * * *